US011115440B2

(12) United States Patent
Vo et al.

(10) Patent No.: US 11,115,440 B2
(45) Date of Patent: Sep. 7, 2021

(54) DYNAMIC THREAT INTELLIGENCE DETECTION AND CONTROL SYSTEM

(71) Applicant: Bank of America Corporation, Charlotte, NC (US)

(72) Inventors: Jimmy Thanh Vo, Charlotte, NC (US); Mary Adelina Quigley, Indian Trail, NC (US); Kimberly Jane Nowell-Berry, Palm City, FL (US)

(73) Assignee: Bank of America Corporation, Charlotte, NC (US)

( * ) Notice: Subject to any disclaimer, the term of this patent is extended or adjusted under 35 U.S.C. 154(b) by 345 days.

(21) Appl. No.: 16/406,386

(22) Filed: May 8, 2019

(65) Prior Publication Data

US 2020/0358829 A1 Nov. 12, 2020

(51) Int. Cl.
*H04L 29/06* (2006.01)
*G06F 40/40* (2020.01)
*G06F 16/22* (2019.01)

(52) U.S. Cl.
CPC .......... *H04L 63/302* (2013.01); *G06F 40/40* (2020.01); *H04L 63/1425* (2013.01); *G06F 16/22* (2019.01); *H04L 63/0272* (2013.01)

(58) Field of Classification Search
CPC ............... H04L 63/302; H04L 63/1425; H04L 63/0272; G06F 40/40; G06F 16/22
USPC ........................................................ 726/22
See application file for complete search history.

(56) References Cited

U.S. PATENT DOCUMENTS

| | | | |
|---|---|---|---|
| 7,822,747 B2 | 10/2010 | Clark et al. | |
| 8,731,994 B2 | 5/2014 | Kass et al. | |
| 9,258,321 B2 | 2/2016 | Amsler et al. | |
| 9,350,601 B2 | 5/2016 | Jain | |
| 9,407,645 B2 | 8/2016 | Modi et al. | |
| 9,665,559 B2 | 5/2017 | Gross et al. | |
| 9,716,721 B2 | 7/2017 | Hovor et al. | |
| 9,760,850 B1 | 9/2017 | Brestoff | |
| 9,762,617 B2 | 9/2017 | Modi et al. | |
| 9,866,580 B2 | 1/2018 | Ahmed et al. | |
| 9,903,338 B2 | 2/2018 | Lin et al. | |
| 9,916,158 B2 | 3/2018 | Dang et al. | |
| 9,948,666 B2 | 4/2018 | Ahmed et al. | |
| 10,083,031 B2 | 9/2018 | Dang et al. | |
| 2015/0207813 A1* | 7/2015 | Reybok ................. | H04L 63/145 726/22 |

(Continued)

*Primary Examiner* — Michael S McNally
(74) *Attorney, Agent, or Firm* — Banner & Witcott, Ltd.; Michael A. Springs

(57) ABSTRACT

Arrangements for detecting, evaluating and controlling intelligence threat data feeds are provided. In some examples, a plurality of threat intelligence data feeds may be received. The threat intelligence data feeds may be received and evaluated to identify one or more feeds that are considered to provide valuable information to the entity implementing the evaluation. For instance, the evaluation may identify one or more feeds or providers that provides accurate data, timely data, and the like. In some examples, based on the evaluation, one or more data feeds may be removed (e.g., data might not be received), one or more alerts may be generated or dismissed, alerts generated for potential threats may be prioritized (e.g., alerts generated based on data from more accurate feeds are prioritized over alerts generated based on data from less accurate feeds).

21 Claims, 13 Drawing Sheets

(56) References Cited

U.S. PATENT DOCUMENTS

2017/0279836 A1  9/2017  Vasseur et al.
2018/0139220 A1* 5/2018  Viswanathan ...... G06F 11/3006

* cited by examiner

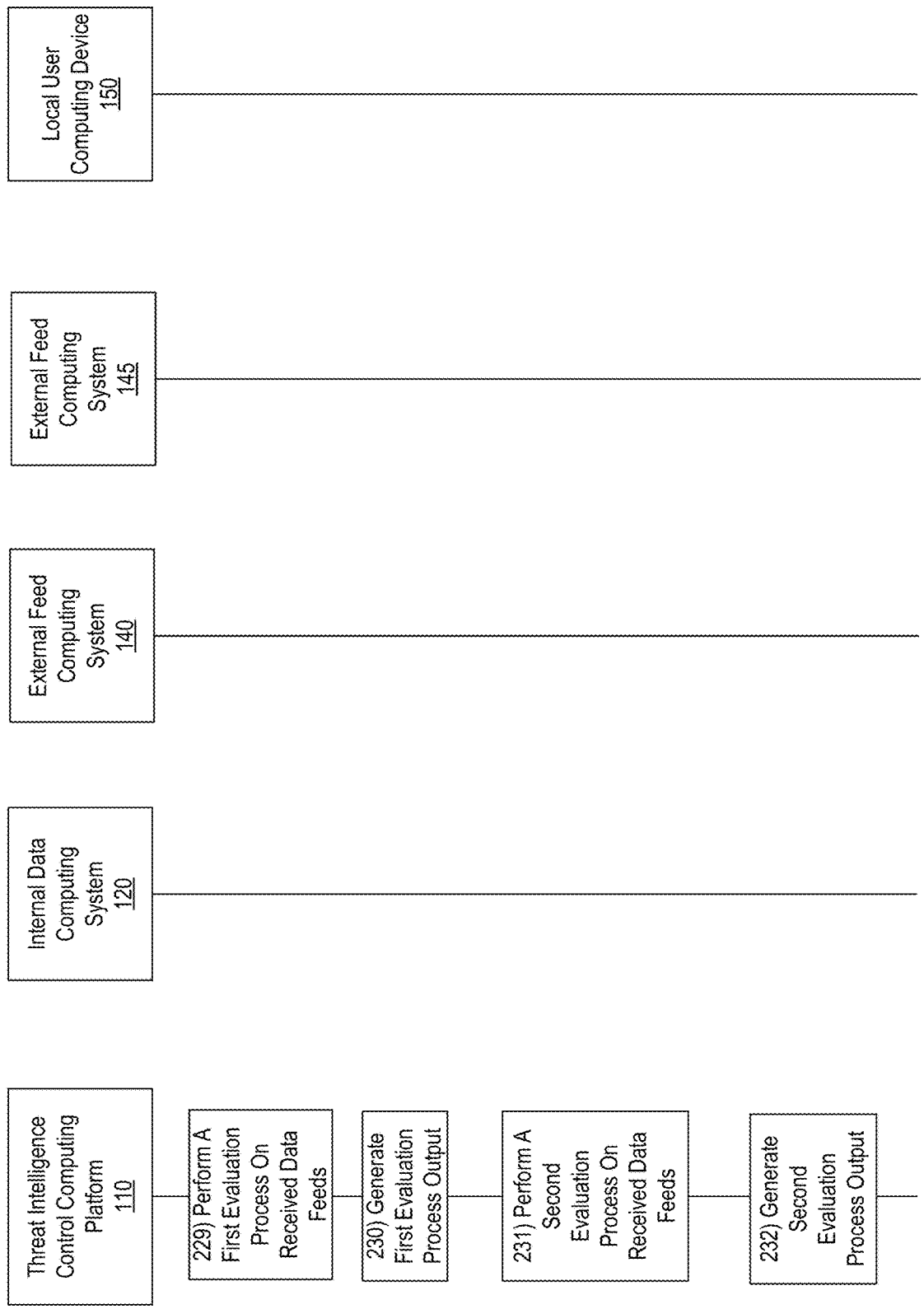

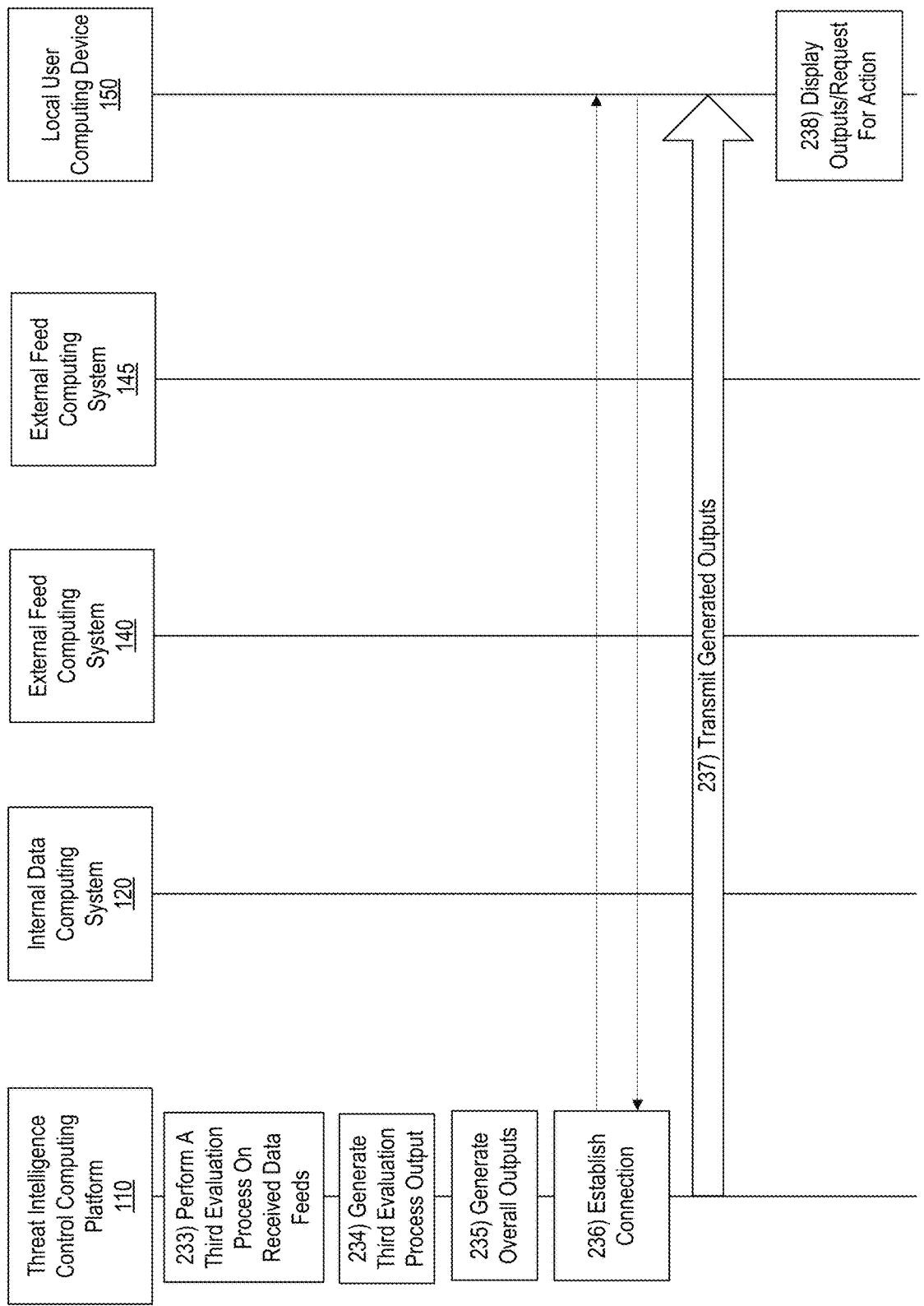

DYNAMIC THREAT INTELLIGENCE DETECTION AND CONTROL SYSTEM

BACKGROUND

Aspects of the disclosure relate to electrical computers, systems, and devices for threat intelligence detection and control. In particular, one or more aspects of the disclosure relate to evaluating incoming threat intelligence data feeds to identify valid threat intelligence data, evaluate providers of threat intelligence data and control response to the received threat intelligence data.

Business entities are diligent about quickly and efficiently identifying potential instances of a security compromise. Many large enterprise organizations subscribe to threat intelligence data feeds that provide data including indications of potential security compromises. In many organizations, a significant number of data feeds are received and it may be difficult to identify feeds providing accurate and timely information. Accordingly, it would be advantageous to evaluate threat intelligence data feeds and feed providers to objectively identify feeds providing the most accurate and timely data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting credible threats to security of an entity and controlling detection and responses to detection.

In some examples, a plurality of threat intelligence data feeds may be received. For instance, threat intelligence data feeds may be received from a plurality of sources associated with a plurality of providers or entities. The threat intelligence data feeds may be received and evaluated to identify one or more feeds that are considered to provide valuable information to the entity implementing the evaluation. For instance, the evaluation may identify one or more feeds or providers that provides accurate data, timely data, and the like. In some examples, based on the evaluation, one or more data feeds may be removed (e.g., data might not be received), one or more alerts may be generated or dismissed, alerts generated for potential threats may be prioritized (e.g., alerts generated based on data from more accurate feeds are prioritized over alerts generated based on data from less accurate feeds).

In some examples, evaluation of the threat intelligence data feeds may include analysis of text within the data to identify terms or pieces of data that are trending, analysis of interdependency between feeds to identify feeds presenting the timeliest information, and/or analysis of incoming data feeds for similarity to a plurality of terms (e.g., processing parameters) that have been identified as relevant to the entity implementing the evaluation. Each evaluation may be performed alone or in combination with other evaluations and an output may be generated that may be used to identify feeds or feed providers having the most accurate, timely information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing dynamic threat intelligence detection and control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to threat intelligence data detection, evaluation and control.

As mentioned above, large enterprise organizations often receive threat intelligence data from a variety of sources. However, the number of sources may make it difficult to efficiently identify threat data that is accurate, timely, or the like. Further, conventional arrangements do not provide a measure of value of a particular data feed or feed provider.

Accordingly, arrangements discussed herein may provide an objective measure of value provided by a data feed or feed provider. In some examples, a plurality of threat intelligence data feeds may be received and evaluated, using one or more evaluation processes. Each of the one or more evaluation process may generate an evaluation process output that may then be used to score or rank each feed, feed provider, or the like. This data may be used to identify feeds or feed providers that bring value to the enterprise, identify and prioritize alerts based on data from the most valuable providers, remote or delete data feeds or feed providers not identified as valuable, and the like.

These and various other arrangements will be discussed more fully below.

Figure 1A:
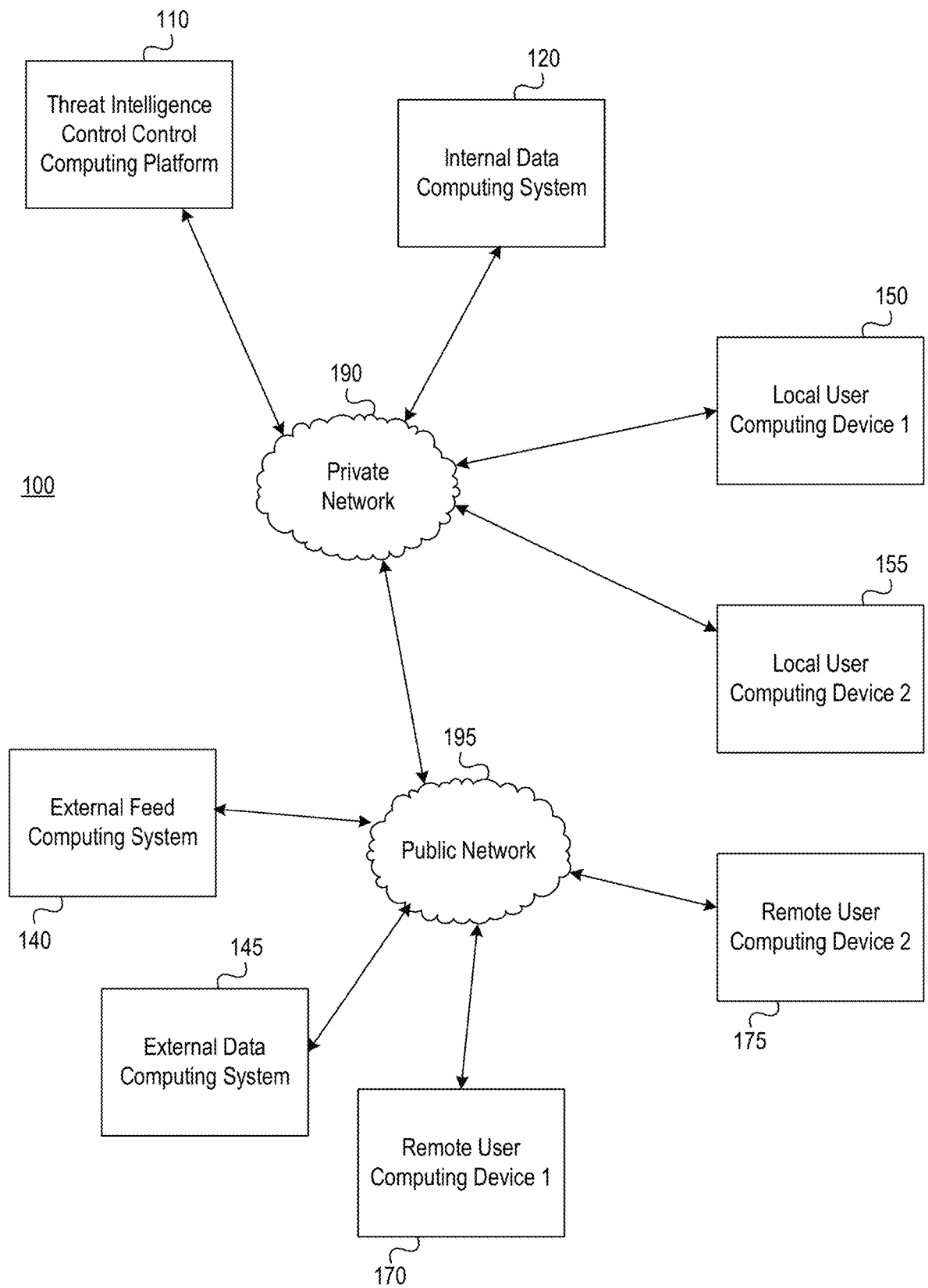
FIGS. 1A and 1B depict an illustrative computing environment for implementing dynamic threat intelligence detection and control functions in accordance with one or more aspects described herein.
Figure 1B:
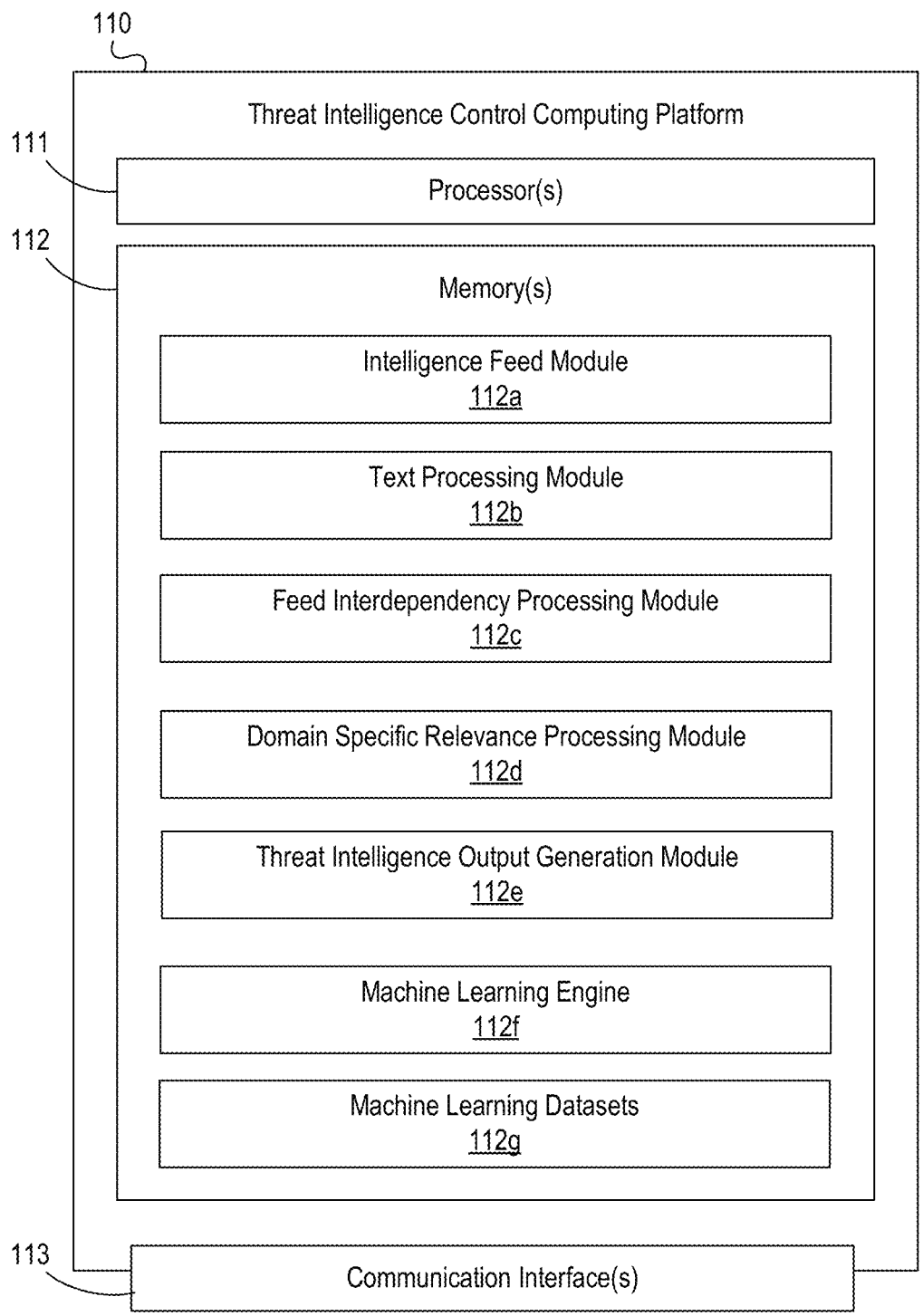

FIGS. 1A and 1B depict an illustrative computing environment for implementing and using a system for dynamic threat intelligence control functions in accordance with one or more aspects described herein. Referring to FIG. 1A, computing environment 100 may include one or more computing devices and/or other computing systems. For example, computing environment 100 may include threat intelligence control computing platform 110, internal data computing system 120, external feed computing system 140, external feed computing system 145, a first local user computing device 150, a second local user computing device 155, a first remote user computing device 170, and a second remote user computing device 175.

Threat intelligence control computing platform 110 may be configured to provide intelligent, dynamic threat intelligence analysis and control that may be used to evaluate threat intelligence feeds and data, evaluate threat intelligence providers, validate data, and the like. For instance, threat intelligence data may be received from a plurality of intelligence data feeds (e.g., from external feed computing system 140, external feed computing system 145, or the like). Although two external feeds are shown in FIG. 1A, more or fewer threat intelligence feeds may be provided without departing from the invention. As data is received via the threat intelligence feeds, data may be evaluated using one or more evaluation processes to identify accurate intelligence feeds, validate data received, and the like.

For instance, a first evaluation process may include evaluating interdependency of one intelligence feed to another based on timeliness of the intelligence data received. For instance, data from one intelligence feed may be compared to data from one or more other intelligence feeds to determine, for instance, duplicate data or repeated receipt of a piece of intelligence data (e.g., a potential or identified threat). The timing of receipt of each piece of intelligence data may be analyzed to determine the earliest occurrence of receipt of the particular data. In some examples, a score or rating for each feed may be generated based on the analysis. The score or ranking may be higher (or perceived to be better) if the timing of the occurrence was identified as a first or earliest occurrence. In addition, repeated occurrences of the same or substantially similar data may provide referential validation of the initial piece of data (e.g., intelligence referenced by other feeds adds credibility to the original source or feed).

Further, the threat intelligence control computing platform 110 may perform another (e.g., a second) evaluation process. The second evaluation process may be different from the first evaluation process and may include topic modeling. For instance, terms or other identified items particularly relevant to the entity implementing the threat intelligence control computing platform 110 may be received by the threat intelligence control computing platform 110. In some examples, one or more topic models may be generated. For instance, topic models may be generated using Latent Dirichlet Allocation (LDA) and/or natural language processing. The topic models may be generated based on the identified terms and may, in some examples, be generated for a predefined time period worth of intelligence data (e.g., 8 hours, one day, one week, or the like). Each LDA distribution for each piece of data or intelligence is then compared to distributions of identified terms. Intelligence data that is most similar to the identified terms are then ranked, with the most similar pieces of intelligence data having a higher or highest ranking than other, less similar, pieces of intelligence. This ranking or score may then be output for use in evaluating feed providers, or the like.

In some examples, matrices may be generated and used to determine similarities. For instance, one the LDA has been completed, identified topics of interest may be represented as matrices. In some examples, Euclidean distance between each matrix vector may be used to determine the similarity between the two. For instance, in one example, topic modeling may return two topics, topic A and topic B. If threat intelligence data feed 1 processed via LDA found both topic A and topic B, the generated vector would be [1,1]. If threat intelligence data feed 2 found just topic A, the generated vector would be [1,0]. The Euclidean distance between the two would be: dist(x, y)=sqrt(dot(x, x)=2*dot(x, y)+dot(y, y)) where dot is the dot product of the matrix vectors. In this example, the distance is 1.

Further, the threat intelligence control computing platform 110 may perform another (e.g., a third) evaluation process. In some arrangements, the third evaluation process may be different from the first evaluation process and the second evaluation process and may include comparing each piece of intelligence in a feed to each other piece of intelligence in the feed and other feeds to rank particular pieces of intelligence. For instance, each piece of intelligence may be tokenized and formatted using natural language processing. In some examples, formatting the data may include removing, for example, stop words from, for instance, a customizable list (e.g., customizable for the entity implementing the threat intelligence control computing platform 110), removing punctuation from the data, removing HyperText Markup Language (HTML) from the data, and the like. After tokenizing and formatting the data, each piece of data may be compared to each other piece of data (e.g., in the same and other feeds) to build a similarity matrix between the pieces of data. In some examples, the similarity matrix may be built using a cosine distance measure and/or Euclidean distance measure, as discussed above. After building the similarity matrix, each piece of intelligence may be ranked or score (e.g., based on similarity) to determine which pieces of intelligence refer to other pieces of intelligence. Data that is referenced often may be ranking or score higher than other pieces of data as an indication that the data is valid or credible based on a number of references.

The scores, outputs, rankings, or the like, from each evaluation process may be aggregated to determine an overall score or ranking for, for example, a particular intelligence data feed, intelligence data feed provider, and the like. The scoring may be used to objectively identify feeds or providers providing usable, valid intelligence, to identify trusted feeds or providers, to eliminate feeds or providers providing inaccurate or unusable information, or the like. In some examples, feeds being received may be modified based on the ranking or scoring generated by the evaluates processes.

Although three evaluation processes are described herein, one or more of the evaluation processes may be used or implemented independently of the other one or more evaluation processes. For instance, one or more of the first evaluation process, second evaluation process and/or third evaluation process may be used independently of one or more of the other two processes (e.g., either alone or in combination with one other process or with all three processes).

Computing environment 100 may further include an internal data computing system 120. In some examples, internal data computing system 120 may receive, transmit, process and/or store data internal to the entity implementing the threat intelligence control computing platform 110. For instance, internal data computing system 120 may store data associated with internal processes, past intelligence threats, mitigation techniques used to mitigate impact of one or more identified threats, historical data, terms or particular types of data that have been identified as particularly suited to the entity, and the like.

Computing environment 100 may further include one or more external feed computing systems, such as external feed computing system 140, external feed computing system 145, and the like. As mentioned above, although two external feed computing systems are shown, more or fewer external feed computing systems may be used without departing from the invention. In some examples, data may be received from a plurality of external feed computing systems (e.g., tens or hundreds or feeds received).

External feed computing system 140, 145 may be associated with an entity separate from the entity implementing the threat intelligence control computing platform 110. In some examples, external feed computing systems 140, 145 may provide threat intelligence feeds to the entity implementing the threat intelligence control computing platform 110. For instance, data feeds including threat intelligence data may be transmitted, via the external feed computing systems 140, 145 to the threat intelligence control computing platform 110 for analysis, mitigation actions, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to provide terms or other items identified as associated with or of interest to the entity implementing the threat intelligence control computing platform 110. Additionally or alternatively, local user computing devices 150, 155 may be used to add or remove a data feed (e.g., delete a data feed such that data is no longer received from that data feed, provider, or the like), prioritize data feeds, identify and implement mitigation actions, and the like.

The remote user computing devices 170, 175 may be used to communicate with, for example, threat intelligence control computing platform 110. For instance, remote user computing devices 170, 175 may include user computing devices, such as mobile devices including smartphones, tablets, laptop computers, and the like, that may be used to communicate with threat intelligence control computing platform 110, implement mitigation actions, and the like.

In one or more arrangements, internal data computing device 120, external feed computing system 140, external feed computing system 145, local user computing device 150, local user computing device 155, remote user computing device 170, and/or remote user computing device 175 may be any type of computing device or combination of devices configured to perform the particular functions described herein. For example, internal data computing system 120, external feed computing system 140, external feed computing system 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing system 120, external feed computing system 140, external feed computing system 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include threat intelligence control computing platform 110. As illustrated in greater detail below, threat intelligence control computing platform 110 may include one or more computing devices configured to perform one or more of the functions described herein. For example, threat intelligence control computing platform 110 may include one or more computers (e.g., laptop computers, desktop computers, servers, server blades, or the like).

As mentioned above, computing environment 100 also may include one or more networks, which may interconnect one or more of threat intelligence control computing platform 110, internal data computing system 120, external feed computing system 140, external feed computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, threat intelligence control computing platform 110, internal data computing system 120, local user computing device 150, local user computing device 155, and, may be associated with an organization (e.g., a financial institution), and private network 190 may be associated with and/or operated by the organization, and may include one or more networks (e.g., LANs, WANs, virtual private networks (VPNs), or the like) that interconnect threat intelligence control computing platform 110, internal data computing system 120, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., threat intelligence control computing platform 110, internal data computing system 120, local user computing device 150, local user computing device 155) with one or more networks and/or computing devices that are not associated with the organization. For example, external feed computing system 140, external feed computing system 145, remote user computing device 170, remote user computing device 175, might not be associated with an organization that operates private network 190 (e.g., because external feed computing system 140, external feed computing system 145, remote user computing device 170, remote user computing device 175, may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect external feed computing system 140, external feed computing system 145, remote user computing device 170, remote user computing device 175, to private network 190 and/or one or more computing devices connected thereto (e.g., threat intelligence control computing platform 110, internal data computing system 120, local user computing device 150, local user computing device 155).

Referring to FIG. 1B, threat intelligence control computing platform 110 may include one or more processors 111, memory 112, and communication interface 113. A data bus may interconnect processor(s) 111, memory 112, and communication interface 113. Communication interface 113 may be a network interface configured to support communication between threat intelligence control computing platform 110 and one or more networks (e.g., private network 190, public network 195, or the like). Memory 112 may include one or more program modules having instructions that when executed by processor(s) 111 cause threat intelligence control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of threat intelligence control computing platform 110 and/or by different computing devices that may form and/or otherwise make up threat intelligence control computing platform 110.

For example, memory 112 may have, store and/or include an intelligence feed module 112a. Intelligence feed module 112a may store instructions and/or data that may cause or enable the threat intelligence control computing platform 110 to receive threat intelligence data feeds from one or more sources (e.g., external feed computing system 140, external feed computing system 145, or the like). In some examples, the data feeds may be received by the intelligence feed module 112a and may be formatted, as needed, for further processing. In some arrangements, intelligence feed module 112a may cause data from one or more threat intelligence feeds to be stored, such as in a database.

As discussed herein, threat intelligence control computing platform 110 may analyze threat intelligence data feeds to identify accurate feeds, relevant feeds, and the like. For instance, threat intelligence control computing platform 110 may perform one or more evaluation processes on the received data feeds. Threat intelligence control computing platform 110 may further have, store or include text processing module 112b. Text processing module 112b may store instructions and/or data that may cause or enable the threat intelligence control computing platform to perform an evaluation process on the received data feeds. For instance, the evaluation process performed by the text processing module 112b may include comparing each piece of intelligence in a feed to each other piece of intelligence in the feed and other feeds to rank particular pieces of intelligence. As discussed herein, each piece of intelligence may be tokenized and formatted using natural language processing. After tokenizing and formatting the data, each piece of data may be compared to each other piece of data (e.g., in the same and other feeds) to build a similarity matrix between the pieces of data. After building the similarity matrix, each piece of intelligence may be ranked or score (e.g., based on similarity) to determine which pieces of intelligence refer to other pieces of intelligence. Data that is referenced often may be ranking or score higher than other pieces of data as an indication that the data is valid or credible based on a number of references.

Threat intelligence control computing platform 110 may further have, store and/or include feed interdependency processing module 112c. Feed interdependency processing module 112c may store instructions and/or data that may cause or enable the threat intelligence control computing platform 110 to evaluate interdependency of one intelligence feed to another based on timeliness of the intelligence data received. For instance, as discussed herein, data from one intelligence feed may be compared to data from one or more other intelligence feeds to determine, for instance, duplicate data or repeated receipt of a piece of intelligence data (e.g., a potential or identified threat). The timing of receipt of each piece of intelligence data may be analyzed to determine the earliest occurrence of receipt of the particular data. In some examples, a score or rating for each feed may be generated based on the analysis. The score or ranking may be higher (or perceived to be better) if the timing of the occurrence was identified as a first or earliest occurrence.

Threat intelligence control computing platform 110 may further have, store and/or include domain specific relevance processing module 112d. Domain specific relevance processing module 112d may store instructions and/or data that may cause or enable the threat intelligence control computing platform to perform another evaluation process including topic modeling. For instance, terms or other identified items particularly relevant to the entity implementing the threat intelligence control computing platform 110 may be received by the threat intelligence control computing platform 110. In some examples, one or more topic models may be generated. For instance, topic models may be generated using Latent Dirichlet Allocation (LDA) and/or natural language processing. The topic models may be generated based on the identified terms and may, in some examples, be generated for a predefined time period worth of intelligence data (e.g., 8 hours, one day, one week, or the like). Each LDA distribution for each piece of data or intelligence is then compared to distributions of identified terms. Intelligence data that is most similar to the identified terms are then ranked, with the most similar pieces of intelligence data having a higher or highest ranking than other, less similar, pieces of intelligence. This ranking or score may then be output for use in evaluating feed providers, or the like.

Threat intelligence control computing platform 110 may further have, store and/or include threat intelligence output generation module 112e. Threat intelligence output generation module 112e may store instructions and/or data that may cause or enable the threat intelligence control computing platform 110 to receive scores, ranks, or other output from one or more other modules in the threat intelligence control computing platform 110 (e.g., text processing module 112b, feed interdependency processing module 112c, domain specific relevance processing module 112d, and the like) and rank the outputs to identify feeds and/or feed providers that are providing accurate, timely, useful data. In some examples, the outputs may be used to rank feeds and/or feed providers. In some arrangements, stack ranking may be used to rank feeds and/or feed providers.

In some arrangements, the outputs from one or more modules may be analyzed and used to identify and/or prioritize alerts. For instance, threat intelligence output generation module 112e may be used to generate one or more alerts including information associated with a potential threat (e.g., based on evaluation of data received in one or more data feeds). In some examples, alerts may be prioritized (e.g., by the threat intelligence output generation module 112e) based on a rank of the feed or feed provider from which the data was received (e.g., higher score feeds or feed providers are generally more accurate and valuable to the entity and alerts associated with data from those feeds or feed providers may be prioritized over other alerts or alerts generated based on other feeds or feed providers).

In some examples, machine learning may be used to aid in evaluating data feeds. Accordingly, threat intelligence control computing platform 110 may further have, store and/or include a machine learning engine 112f and machine learning datasets 112g. Machine learning engine 112f and machine learning datasets 112g may store instructions and/or data that may cause or enable threat intelligence control computing platform 110 to receive data from one or more sources, analyze data to identify patterns or sequences within threat data, and the like. The machine learning datasets 112g may be generated based on analyzed data (e.g., data from previously received data, and the like), raw data, and/or received from one or more outside sources.

The machine learning engine 112f may receive data from one or more data feeds and, using one or more machine learning algorithms, may generate one or more machine learning datasets 112g. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

FIGS. 2A-2G depict one example illustrative event sequence for implementing and using threat intelligence control functions in accordance with one or more aspects described herein. The events shown in the illustrative event sequence are merely one example sequence and additional events may be added, or events may be omitted, without departing from the invention.

Figure 2A:
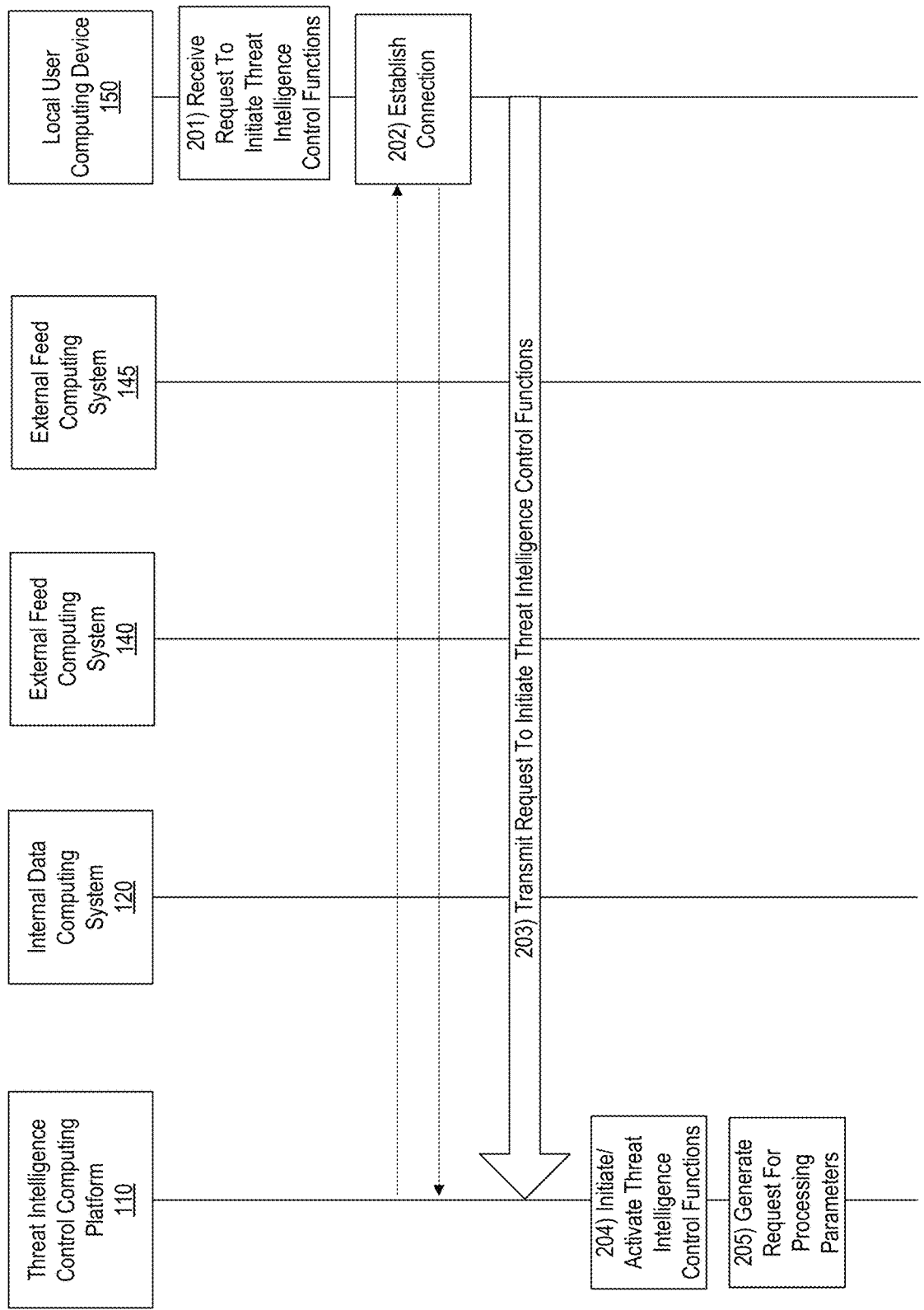

Referring to FIG. 2A, at step 201, a request to initiate threat intelligence control functions may be received by, for example, local user computing device 150. For instance, a user, such as an employee of an entity implementing the threat intelligence control computing platform 100, may input, into a computing device, such as local user computing device 150, a request to initiate threat intelligence control functions.

At step 202, a connection may be established between the local user computing device 150 and the threat intelligence control computing platform 110. For instance, a first wireless connection may be established between the local user computing device 150 and the threat intelligence control computing platform 110. Upon establishing the first wireless connection, a communication session may be initiated between the local user computing device 150 and the threat intelligence control computing platform 110.

At step 203, the request to initiate threat intelligence control functions may be transmitted from the local user computing device 150 to the threat intelligence control computing platform 110. For instance, the request to initiate threat intelligence control functions may be transmitted during the communication session established upon initiating the first wireless connection.

At step 204, the request to initiate threat intelligence control functions may be received by the threat intelligence control computing platform 110 and executed to initiate and/or activate one or more threat intelligence control functions. For instance, one or more threat intelligence control functions that was previously disabled or unavailable may be enabled, activated and/or initiated.

At step 205, a request for processing parameters may be received. For instance, a request for one or more terms or other items identified as having particular relevance to the entity implementing the threat intelligence control computing platform 110 may be generated. As discussed herein, the terms or items may be used to performed one or more evaluation processes.

Figure 2B:
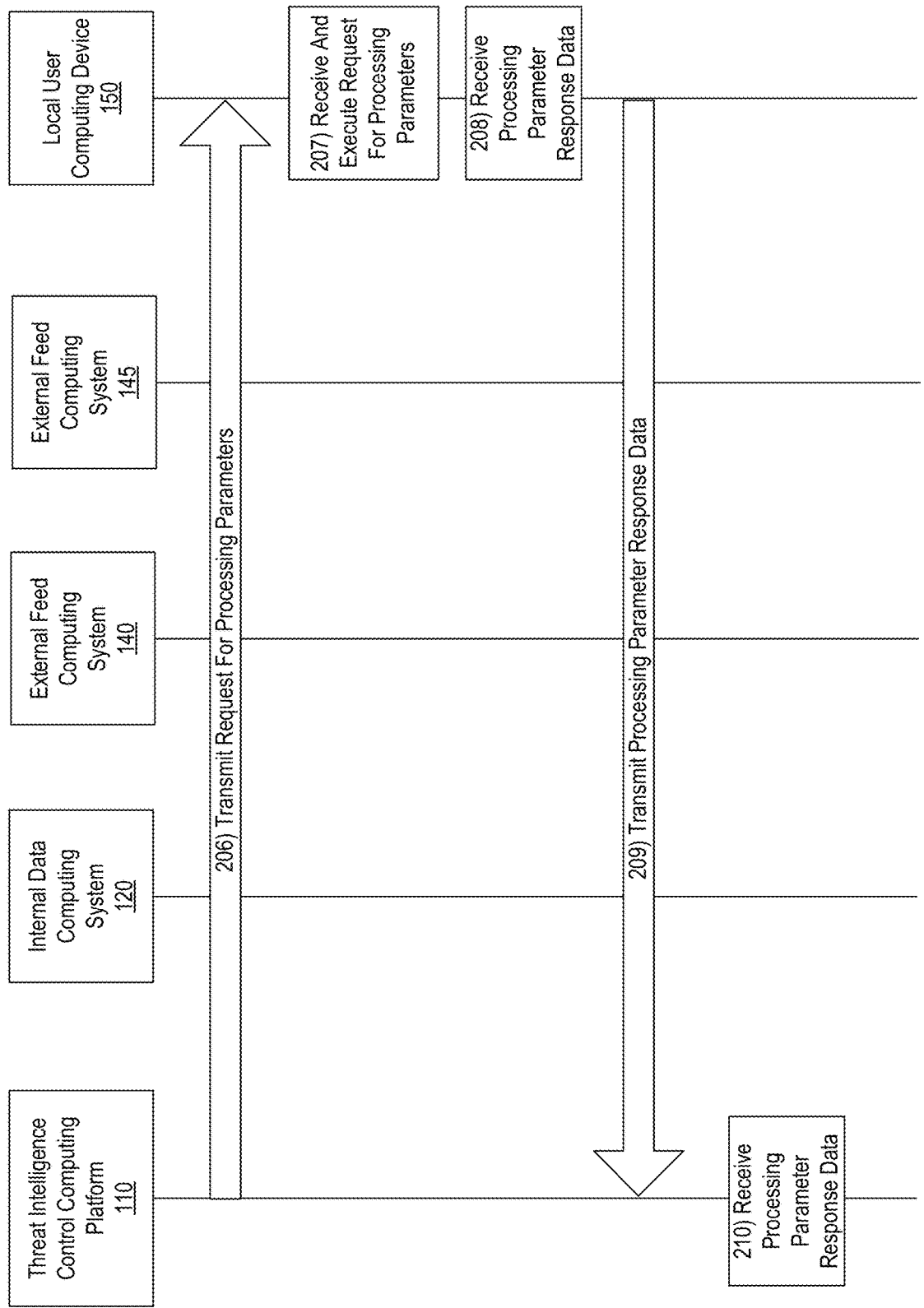

With reference to FIG. 2B, at step 206, the request for processing parameters may be transmitted from the threat intelligence control computing platform 110 to the local user computing device 150. At step 207, the request may be received by the local user computing device 150 and executed by the local user computing device 150. In some examples, receiving the request may include displaying the request on a display of the local user computing device 150.

At step 208, user input may be received including one or more processing parameters and processing parameter response data may be generated based on the received user input. As discussed herein, the processing parameter response data may include one or more terms, items, or the like, that have been identified (e.g., via user experience, historical data, machine learning, industry terminology, or the like) as terms or items having particular relevance to the entity implementing the threat intelligence control computing platform 110. For instance, if the entity implementing the threat intelligence control computing platform 110 is a financial institution, the processing parameter response data may include terms or items relevant to the banking industry, financial terms, or the like.

At step 209, the processing parameter response data may be transmitted from the local user computing device 150 to the threat intelligence control computing platform 110.

At step 210, the processing parameter response data may be received by the threat intelligence control computing platform 110 and may be processed. For instance, in some examples, the processing parameter response data may be used to generate one or more topic models that can be used for comparison with topic models generated based on incoming data in one or more evaluation processes, as will be discussed more fully herein.

Figure 2C:
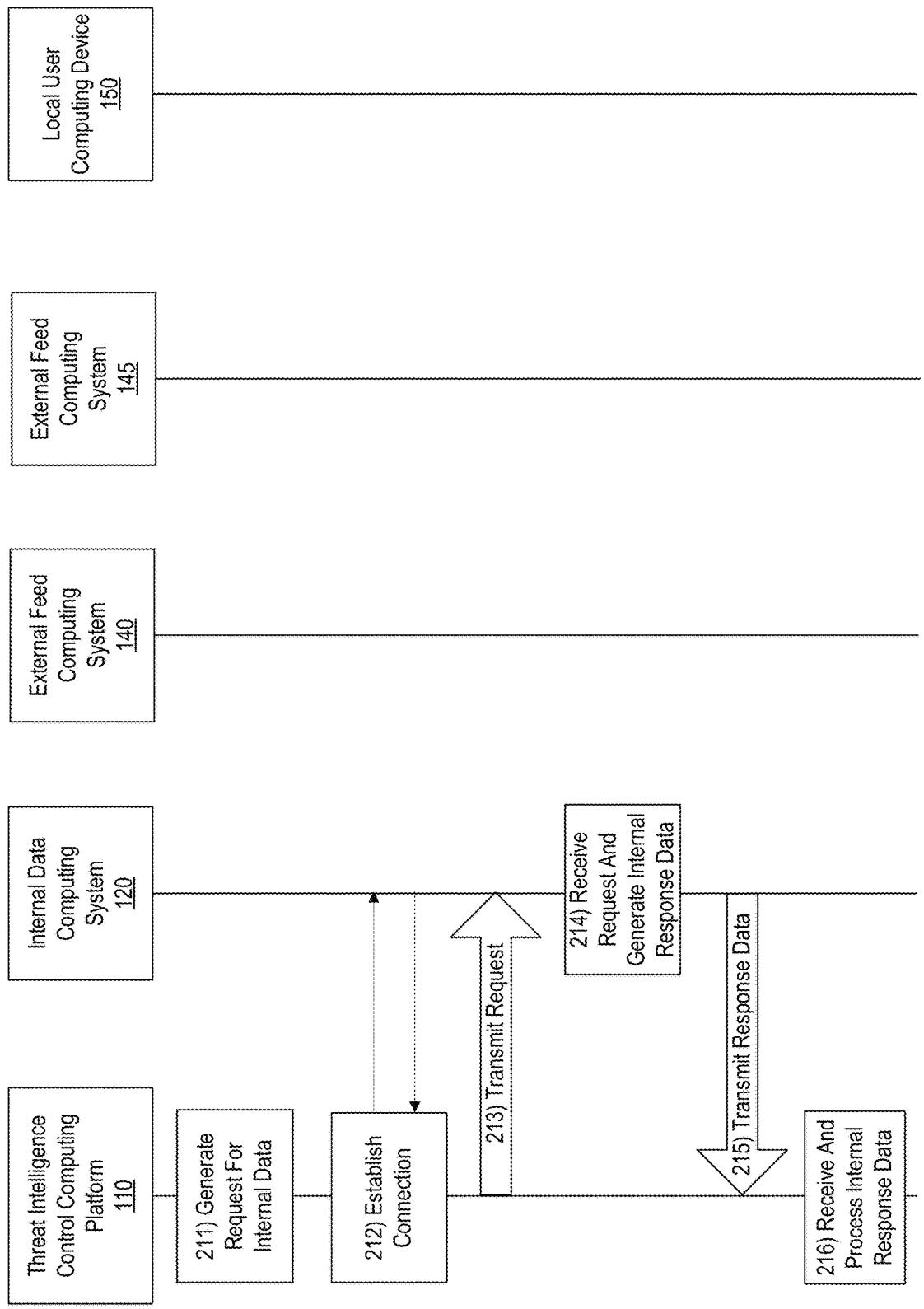

With reference to FIG. 2C, at step 211, a request for internal data may be generated. For instance, a request for data associated with historical threats, mitigating actions, generated alerts, or the like, may be generated.

At step 212, a connection may be established between the threat intelligence control computing platform 110 and internal data computing system 120. For instance, a second wireless connection may be established between the threat intelligence control computing platform 110 and the internal data computing system 120. Upon establishing the second wireless connection, a communication session may be initiated between the threat intelligence control computing platform 110 and the internal data computing system 120.

At step 213, the request for internal data may be transmitted from threat intelligence control computing platform 110 to the internal data computing system 120. For instance, the request for internal data may be transmitted during the communication session established upon initiating the second wireless connection.

At step 214, the request for internal data may be received and execute and internal response data may be generated. For instance, requested data may be extracted from one or more databases and used to generate internal response data.

At step 215, the internal response data may be transmitted from the internal data computing system 120 to the threat intelligence control computing platform 110. At step 216, the internal response data may be received by the threat intelligence control computing platform 110 and processed. In some examples, processing the internal data may include generating one or more machine learning datasets, predicting, based on one or more machine learning datasets, an impact of a potential threat, or the like.

Figure 2D:
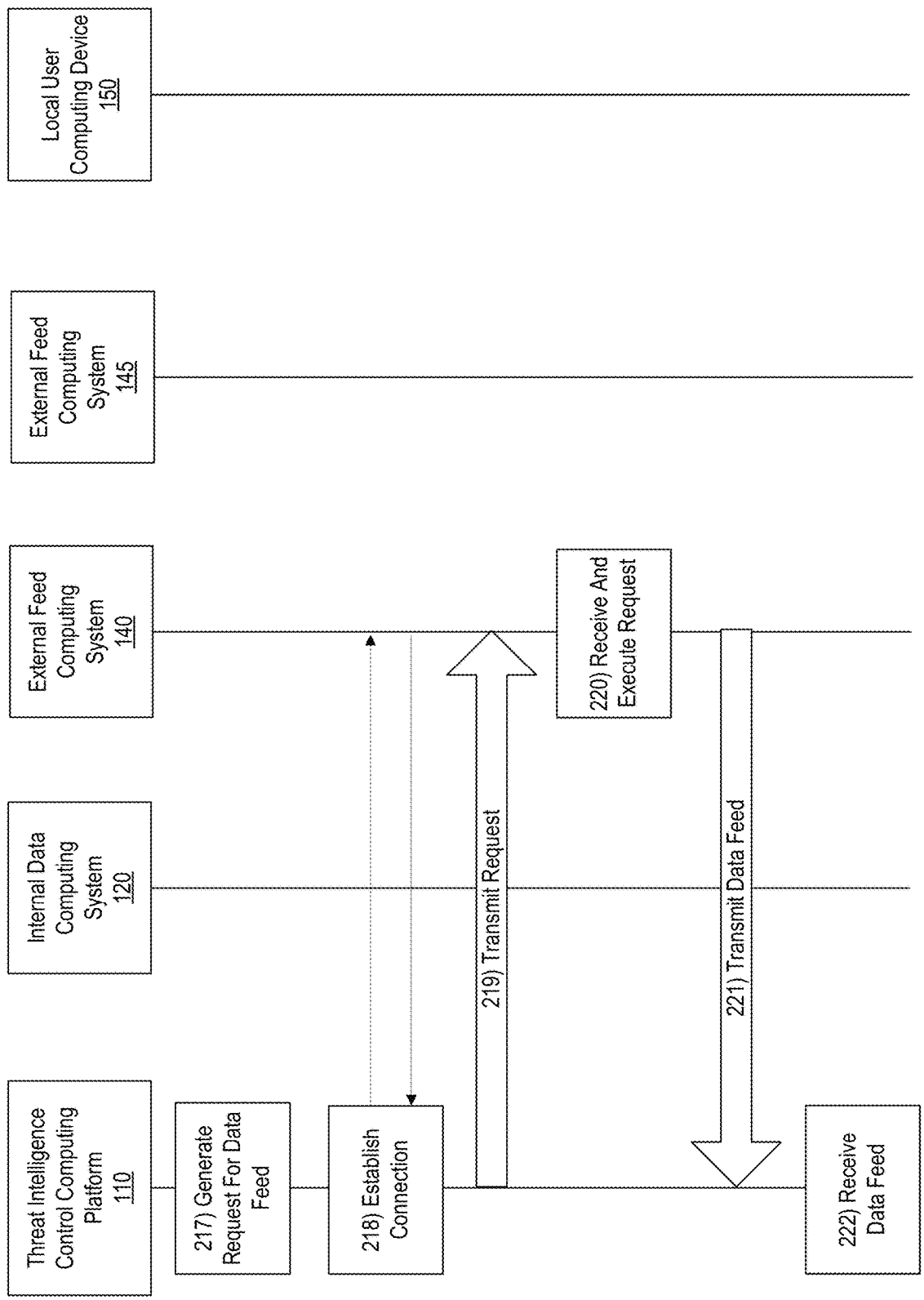

With reference to FIG. 2D, at step 217, a request for a first data feed, such as a threat intelligence data feed, may be generated. At step 218, a connection may be established between the threat intelligence control computing platform 110 and external feed computing system 140. For instance, a third wireless connection may be established between the threat intelligence control computing platform 110 and external feed computing system 140. Upon establishing the third wireless connection, a communication session may be initiated between the threat intelligence control computing platform 110 and the external feed computing system 140.

At step 219, the request for the first intelligence feed data may be transmitted from the threat intelligence control computing platform 110 to the external feed computing system 140. For instance, the request for first feed data may be transmitted during the communication session established upon initiating the third wireless connection.

At step 220, the request for first intelligence feed data may be received by external feed computing system 140 and executed by the external feed computing system 140. Executing the request may include providing a first data feed including threat intelligence data to the threat intelligence control computing platform 110. In some examples, the first data feed may be continuously transmitted (e.g., in real-time or near real-time). Additionally or alternatively, the first data feed may be transmitted as predetermined times, at preset intervals, after expiration of a predetermined time period, or the like.

At step 221, the requested first data feed may be transmitted from the external feed computing system 140 to the threat intelligence control computing platform 110. At step 222, the first feed data may be received by the threat intelligence control computing platform 110.

Figure 2E:
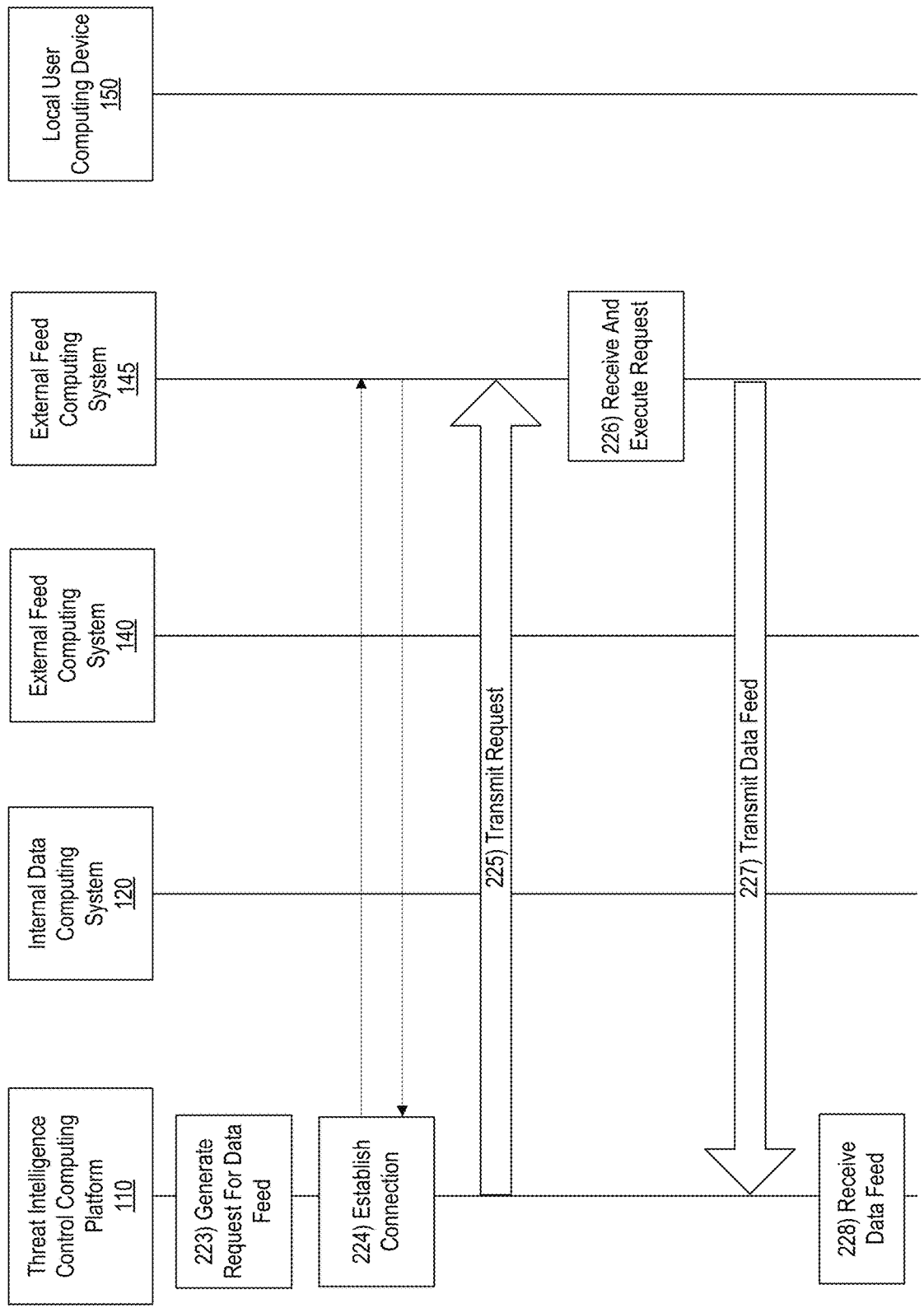

With reference to FIG. 2E, at step 223, a request for a second data feed, such as a second threat intelligence data feed, may be generated. In some examples, the second data feed may be from a second source different from the source of the first data feed.

At step 224, a connection may be established between the threat intelligence control computing platform 110 and external feed computing system 145. For instance, a fourth wireless connection may be established between the threat intelligence control computing platform 110 and external feed computing system 145. Upon establishing the fourth wireless connection, a communication session may be initiated between the threat intelligence control computing platform 110 and the external feed computing system 145.

At step 225, the request for second intelligence feed data may be transmitted from the threat intelligence control computing platform 110 to the external feed computing system 145. For instance, the request for second intelligence feed data may be transmitted during the communication session established upon initiating the fourth wireless connection.

At step 226, the request for second intelligence feed data may be received by external feed computing system 145 and executed by the external feed computing system 145. Executing the request may include providing a second data feed including threat intelligence data to the threat intelligence control computing platform 110. In some examples, the second data feed may be continuously transmitted (e.g., in real-time or near real-time). Additionally or alternatively, the second data feed may be transmitted as predetermined times, at preset intervals, after expiration of a predetermined time period, or the like.

At step 227, the requested second data feed may be transmitted from the external feed computing system 145 to the threat intelligence control computing platform 110. At step 228, the second feed data may be received by the threat intelligence control computing platform 110.

With reference to FIG. 2F, at step 229, a first evaluation process may be performed on the received feed data. For instance, a first evaluation process may be performed on the first feed data received from external feed computing system 140, the second feed data received from external feed computing system 145, as well as any additional data feeds received from one or more other sources.

As discussed herein, a first evaluation process may include evaluating interdependency of one intelligence feed to another based on timeliness of the intelligence data received. For instance, as discussed herein, data from one intelligence feed may be compared to data from one or more other intelligence feeds to determine, for instance, duplicate data or repeated receipt of a piece of intelligence data (e.g., a potential or identified threat). The timing of receipt of each piece of intelligence data may be analyzed to determine the earliest occurrence of receipt of the particular data.

At step 230, a first evaluation process output may be generated. For instance, a score or rating for each feed may be generated based on the analysis performed in step 229. For instance, a feed may receive a score or ranking that is higher (or perceived to be better) if the timing of an occurrence of a piece of data within the feed was identified as a first or earliest occurrence of receipt of the piece of data. In addition, repeated occurrences of the same or substantially similar data may provide referential validation of the initial piece of data (e.g., intelligence referenced by other feeds adds credibility to the original source or feed).

At step 231, a second evaluation process may be performed on the received feed data. For instance, a second evaluation process may be performed on the first feed data received from external feed computing system 140, the second feed data received from external feed computing system 145, as well as any additional data feeds received from one or more other sources.

In some examples, the second evaluation process may include topic modeling. For instance, terms or other identified items particularly relevant to the entity implementing the threat intelligence control computing platform 110 (e.g., processing parameter response data received in step 210) may be received by the threat intelligence control computing platform 110. In some examples, one or more topic models may be generated. For instance, topic models may be generated using Latent Dirichlet Allocation (LDA) and/or natural language processing. The topic models may be generated based on the identified terms. In some examples, LDA may be used to evaluating the incoming data feeds and LDA distribution may be generated for a predefined time period worth of intelligence data (e.g., 8 hours, one day, one week, or the like). Each LDA distribution for each piece of data or intelligence is then compared to LDA distributions of identified terms (e.g., processing parameter response data).

At step 232, a second evaluation process output may be generated. For instance, based on the evaluation process performed at step 231, intelligence data that is most similar to the identified terms (e.g., based on comparison of LDA distributions) may be ranked, with the most similar pieces of intelligence data having a higher or highest ranking than other, less similar, pieces of intelligence. This ranking or score may then be output for use in evaluating feed providers, or the like.

With reference to FIG. 2G, at step 233, a third evaluation process may be performed. For instance, a third evaluation process may be performed on the first feed data received from external feed computing system 140, the second feed data received from external feed computing system 145, as well as any additional data feeds received from one or more other sources.

In some examples, the third evaluation process may include comparing each piece of intelligence in a feed to each other piece of intelligence in the feed and other feeds to rank particular pieces of intelligence. For instance, each piece of intelligence may be tokenized and formatted using natural language processing. In some examples, formatting the data may include removing, for example, stop words from, for instance, a customizable list (e.g., customizable for the entity implementing the threat intelligence control computing platform 110), removing punctuation from the data, removing HyperText Markup Language (HTML) from the data, and the like. After tokenizing and formatting the data, each piece of data may be compared to each other piece of data (e.g., in the same and other feeds) to build a similarity matrix between the pieces of data. In some examples, the similarity matrix may be built using a cosine distance measure.

At step 234, a third evaluation process output may be received. For instance, based on the evaluation process performed in step 233, after building the similarity matrix, each piece of intelligence may be ranked or score (e.g., based on similarity) to determine which pieces of intelligence refer to other pieces of intelligence. Data that is referenced often may be ranking or score higher than other pieces of data as an indication that the data is valid or credible based on a number of references.

As discussed above, although three evaluation processes are discussed, each evaluation process may be used independently or in combination with one or more other evaluation processes. Further, although the evaluation processes are labeled "first," "second," and "third," the evaluation processes may be performed in any order without departing from the invention.

At step 235, one or more overall outputs may be generated. For instance, the threat intelligence control computing platform 110 may rank each feed or feed provider based on the outputs generated by each evaluation process. In some examples, stack ranking may be used to rank each feed or feed provider. The rankings may provide an objective indication of which feeds and/or feed providers provide valuable (e.g., accurate, timely, and the like) threat intelligence data. Accordingly, one or more alerts may be generated and/or prioritized based on the outputs (e.g., alerts and alert priorities may be part of an overall output generated).

At step 236, a connection may be established between the threat intelligence control computing platform 110 and local user computing device 150. For instance, a fifth wireless connection may be established between the threat intelligence control computing platform 110 and local user computing device 150. Upon establishing the fifth wireless connection, a communication session may be initiated between the threat intelligence control computing platform 110 and the local user computing device 150.

At step 237, the generated outputs (e.g., overall outputs, alerts, alert priorities, or the like) may be transmitted from the threat intelligence control computing platform 110 to the local user computing device 150. For instance, the outputs may be transmitted during the communication session established upon initiating the fifth wireless connection.

At step 238, the outputs may be received by the local user computing device 150 and displayed on a display of the local user computing device 150. In some examples, the display may include a request for action (e.g., mitigating action, response to alert, or the like). A user may input response data (e.g., via a user interface displaying the generated outputs and/or requesting action) and one or more actions or events may be executed (e.g., to mitigate impact of a threat, to remove a data feed stream, or the like).

Figure 3:
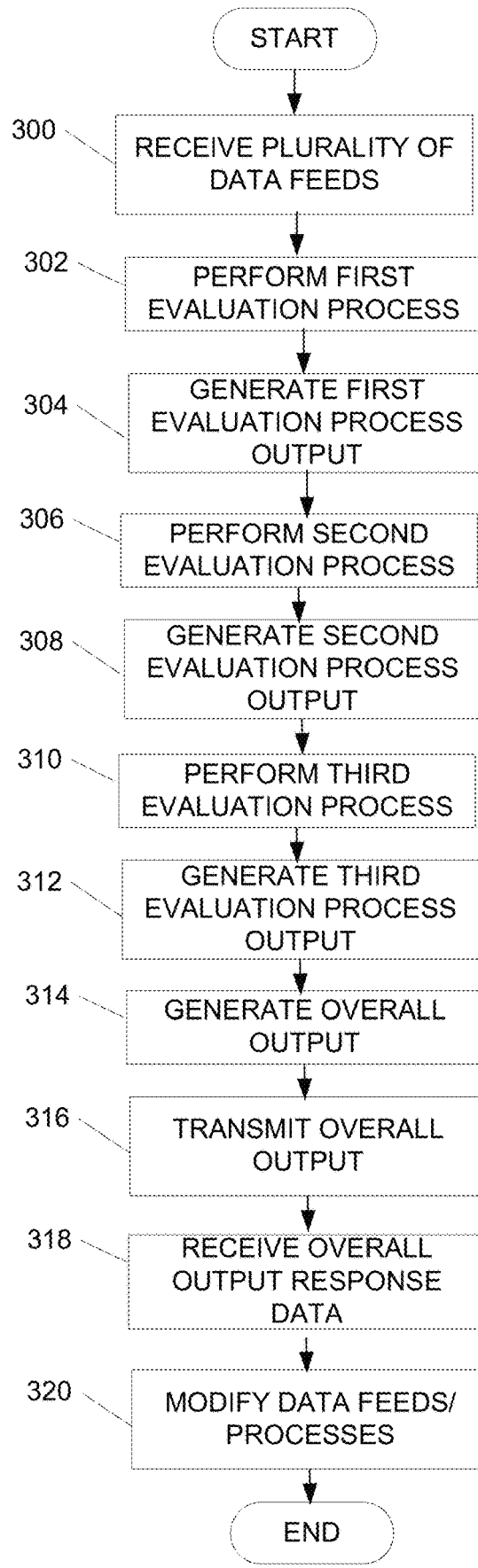
FIG. 3 depicts an illustrative method for implementing and using dynamic threat intelligence detection and control functions according to one or more aspects described herein.

FIG. 3 is a flow chart illustrating one example method of threat intelligence control according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, a plurality of threat intelligence data feeds may be received. As discussed herein, the plurality of threat intelligence data feeds may be received from a plurality of sources (e.g., intelligence threat data feeds from a plurality of providers). In some examples, the data feeds may include various indications of compromise or potential compromise. In some examples, the indications may include words or terms, universal resource locators (URL), hash tags, and the like.

At step 302, a first evaluation process may be performed. For instance, a first evaluation process may include a text evaluation process. As discussed more fully above, the text evaluation process may include comparing each piece of data in a feed to each other piece of data in the same or other feeds to identify similarities between pieces of data. This comparison may provide an indication of terms, threats, data points, or the like that are currently trending (e.g., are being mentioned often in one or more threat intelligence feeds). Further, the frequency of similar terms being identified may provide credibility to a particular piece of data (e.g., the more times a particular piece of data or similar data is mentioned the more likely it is to be an actual threat).

Based on the first evaluation process, a first evaluation process output may be generated at step 304. The first evaluation process output may include an indication of similarity of one or more pieces of data and/or a ranking or score associated with the piece of data. The ranking or score may be based on a level of similarity to other items in data feeds. In some examples, the first evaluation process output may include an indication of a feed associated with a particular piece of data and/or a provider associated with the feed. In some examples, each data feed may receive a score or rank in the first evaluation process output.

At step 306, a second evaluation process may be performed. For instance, a second evaluation process may include a feed interdependency evaluation. As discussed more fully above, the feed interdependency evaluation may include mapping interdependency of one more pieces of data to identify a first receipt or occurrence of the piece of data in the plurality of data streams or feeds. In some examples, the first occurrence may be an indication of timeliness of the provider's data. Further, additional references or occurrences of the same piece of data in the same or other data feeds may add credibility to the piece of data.

Based on the second evaluation process, a second evaluation process output may be generated at step 308. The second evaluation process output may include an indication of the first occurrence of a piece of data and/or the data feeds and/or provider associated with that occurrence. Further, the second evaluation process output may include a score or ranking associated with the feed from which the first occurrence was identified. The ranking may be higher for earlier occurrences of the piece of data. In some examples, the second evaluation process output may include a score or rank for each data feed or data feed provider.

At step 310, a third evaluation process may be performed. For instance, a third evaluation process may include domain specific relevance evaluation. As discussed more fully herein, domain specific relevance evaluation may include receiving a plurality of terms or other items (e.g., processing parameters received) that are related to an industry or other aspect associated with the entity implementing the threat intelligence control computing platform 110. The received terms may be compared to terms from incoming data feeds to identify particular pieces of data, feeds, providers, or the like, that are related to the entity (e.g., based on similarity to the identified terms or other items).

Based on the third evaluation process, a third evaluation process output may be generated at step 312. The third evaluation process output may include a score or ranking of a particular feed, feed provider, or the like, based on similarity of incoming data to identified terms (e.g., processing parameters received). The ranking may be higher for feeds or feed providers having more similar terms identified.

At step 314, an overall output may be generated. For instance, the outputs from one or more of the first evaluation process, second evaluation process and third evaluation process may be aggregated to identify a score or overall ranking for a particular feed or feed provider. In some arrangements, a ranking or score for each output may be summed and the overall output may be based on the sum total. In some examples, the feed or feed provider may be stack ranked to identify feeds or feed providers providing the most value to the entity. In some examples, the overall output may include identification of one or more data feeds for removal from the system (e.g., to no longer transmit data to the threat intelligence control computing platform 110).

In some examples, the overall output may include priority ranking for alerts (e.g., based on feeds or feed providers identified as valuable to the entity). In some examples, the overall output may include a request for user input to take a particular action (e.g., initiate mitigation steps, dismiss alert, remove data feed or provider, or the like).

At step 316, the overall output may be transmitted from the threat intelligence control computing platform 110 to a local user computing device 150. In some examples, the overall output may be displayed by a display of the local user computing device 150 and may, in some arrangements, include a request for user input in response to the overall output, to implement one or more actions, or the like.

At step 318, overall output response data may be received. For instance, user input provided to the local user computing device 150 in response to a request for input may be received and transmitted to the threat intelligence control computing platform 110. Based on the received response data, one or more actions may be executed. For instance, feeds from which data is received may be modified (e.g., connections to one or more external feed computing system may be terminated), alerts may be prioritized or dismissed, or the like.

Figure 4:
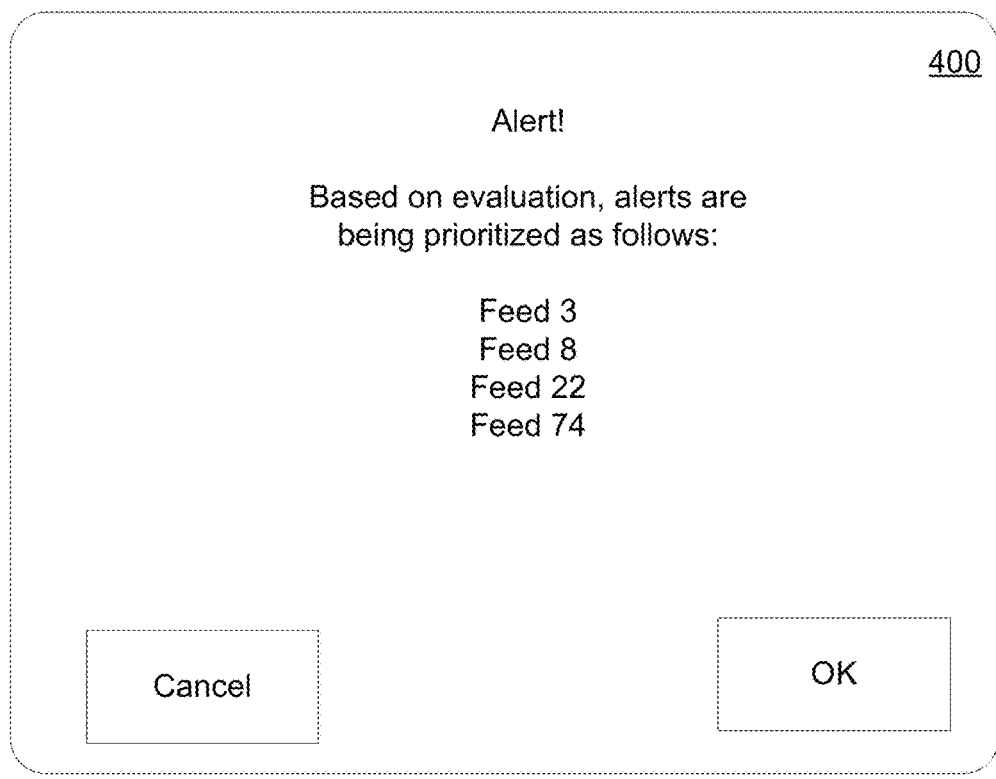
FIGS. 4 and 5 illustrate example user interfaces that may be generated and displayed in accordance with one or more aspects described herein.

FIG. 4 illustrates one example user interface 400 that may be displayed (e.g., via local user computing device 150). The user interface 400 includes an indication of an overall output, including a priority ranking for alerts from one or more threat intelligence data feeds that have been evaluating using one or more arrangements described herein. The user may select "OK" option to maintain or executing the priority listed, or may select "Cancel" option to revise or remove the identified priority.

Figure 5:
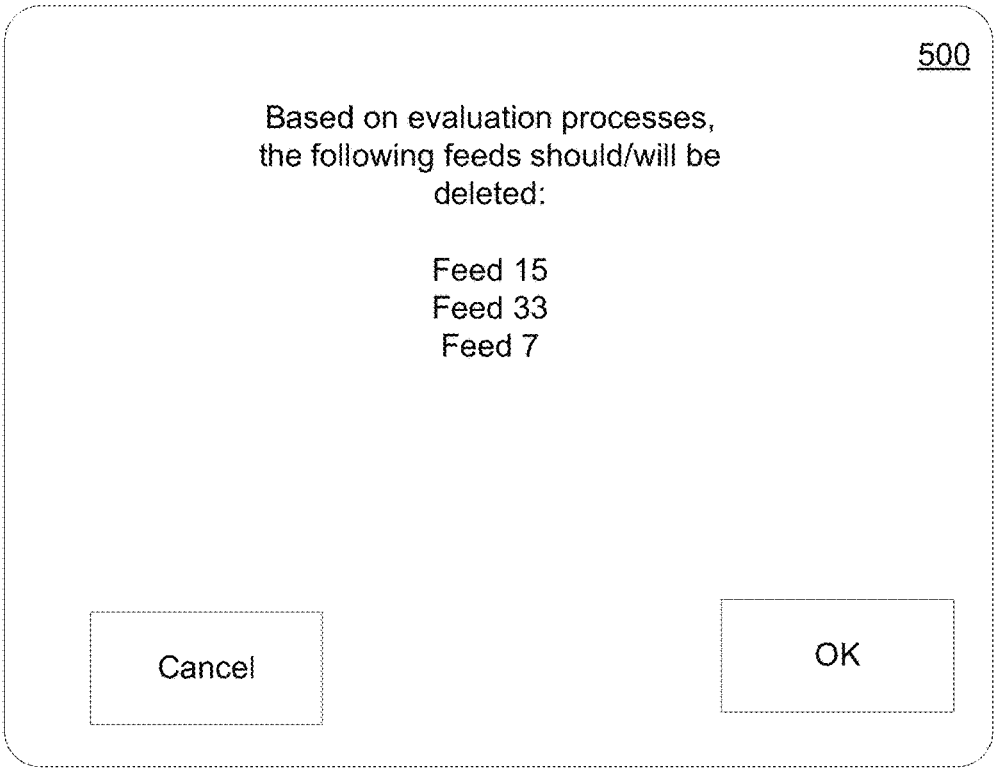

FIG. 5 illustrates one example user interface 500 that may be displayed (e.g., via local user computing device 150). The user interface 500 includes an indication of an overall output including identification of feeds that were ranking low or lowest, and an indication that the feeds identified will or should be deleted. For instance, in some examples, the lowest ranked feeds or feed providers may be automatically deleted (e.g., without additional user input). In some examples, the system may identify a number of lowest ranked feeds to automatically delete (e.g., bottom 3, lowest 5 or the like). Additionally or alternatively, the user interface may request user input confirming deletion of the feeds prior to deleting the identified feeds. Upon receiving the user input confirming deletion of the feeds, the feeds may be deleted.

As discussed herein, aspects described provide an objective measure of threat intelligence data feeds that are considered valuable to an entity implementing the system of evaluation. For instance, in arrangements in which an entity pays a fee to subscribe to one or more threat intelligence data feeds, the arrangements described herein provide an objective measure of return on the investment in the subscription.

Further, the arrangements described herein provide a flexible approach to evaluation of data feeds to allow for contextual pieces, aspects particular to an entity or industry, or the like, to be customized when evaluating data feeds to further improve accuracy.

In addition, the arrangements described herein provide a better understanding of sharing between data feeds, interdependency between feeds, and the like, to further identify accurate and timely data feeds or feed providers.

As discussed above, although three evaluation processes are described, more or fewer evaluation processes may be used without departing from the invention. Further, as discussed herein, each evaluation process described may be used individually (e.g., independently of the other two processes), or in combination with one or more other processes. Further, although the evaluation processes are identified as a first process, a second process, and a third process, the processes may be performed in any order, in parallel or in series, and any of the processes described herein may be labeled first evaluation process, second evaluation process or third evaluation process without departing from the invention.

The arrangements discussed herein may be performed in real-time or near real-time or in batches (e.g., on a periodic or aperiodic basis). In some examples, the evaluation aspects described herein may be performed on a predetermined schedule (e.g., once per day, once per 8 hour shift, or the like). In some arrangements, the frequency of performance of the arrangements described herein may be customizable by the entity implementing the system.

In some examples, previous historical data may be used to train the model or system in order to generate initial rankings. In some examples, data from a predefined time period (e.g., one month, two months, six months, or the like) may be used.

In some arrangements, after identifying the highest ranked feeds or feed providers, additional processing may be provided to extract particular threat data, identify mitigation actions to take in response to the threat data, and the like. In some examples, this may be performed by the threat intelligence data control computing platform 110 and/or by an additional human analyst.

As discussed herein, stack ranking may be used to rank the data feeds or feed providers. In some examples, the overall output may include a cost for a particular feed or feed provider. The ranking may, in some arrangements, be performed using cost as at least one factor in ranking. This data may be used to negotiate future pricing for data feeds, and the like.

In some examples, one or more evaluation process may be used individually to provide data tagging functions. For instance, domain specific relevance and the related Latent Dirichlet Allocation may be used to automatically tag intelligence data that may be used in other applications. In some examples, one or more particular actions may be executed based on the generated data tags.

The above-described examples and arrangements are merely some example arrangements in which the systems described herein may be used. Various other arrangements employing aspects described herein may be used without departing from the invention.

Figure 6:
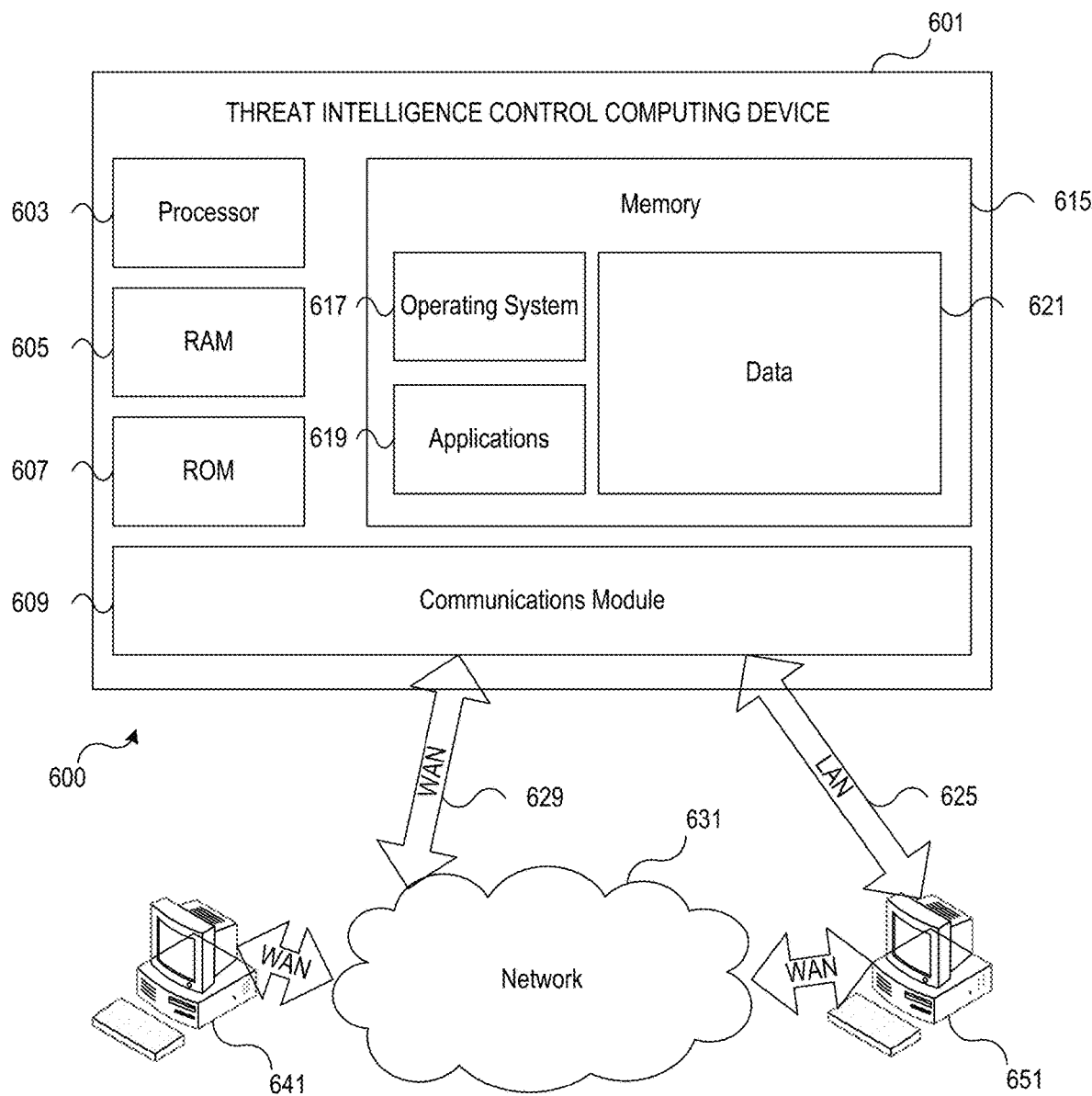
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include threat intelligence control computing device 601 having processor 603 for controlling overall operation of threat intelligence control computing device 601 and its associated components, including Random Access Memory (RAM) 605, Read-Only Memory (ROM) 607, communications module 609, and memory 615. Threat intelligence control computing device 601 may include a variety of computer readable media. Computer readable media may be any available media that may be accessed by threat intelligence control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on threat intelligence control computing device 601. Such a processor may execute computer-executable instructions stored on a computer-readable medium.

Software may be stored within memory 615 and/or storage to provide instructions to processor 603 for enabling threat intelligence control computing device 601 to perform various functions as discussed herein. For example, memory 615 may store software used by threat intelligence control computing device 601, such as operating system 617, application programs 619, and associated database 621. Also, some or all of the computer executable instructions for threat intelligence control computing device 601 may be embodied in hardware or firmware. Although not shown, RAM 605 may include one or more applications representing the application data stored in RAM 605 while threat intelligence control computing device 601 is on and corresponding software applications (e.g., software tasks) are running on threat intelligence control computing device 601.

Communications module 609 may include a microphone, keypad, touch screen, and/or stylus through which a user of threat intelligence control computing device 601 may provide input, and may also include one or more of a speaker for providing audio output and a video display device for providing textual, audiovisual and/or graphical output. Computing system environment 600 may also include optical scanners (not shown).

Threat intelligence control computing device 601 may operate in a networked environment supporting connections to one or more remote computing devices, such as computing devices 641 and 651. Computing devices 641 and 651 may be personal computing devices or servers that include any or all of the elements described above relative to threat intelligence control computing device 601.

The network connections depicted in FIG. 6 may include Local Area Network (LAN) 625 and Wide Area Network (WAN) 629, as well as other networks. When used in a LAN networking environment, threat intelligence control computing device 601 may be connected to LAN 625 through a network interface or adapter in communications module 609. When used in a WAN networking environment, threat intelligence control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
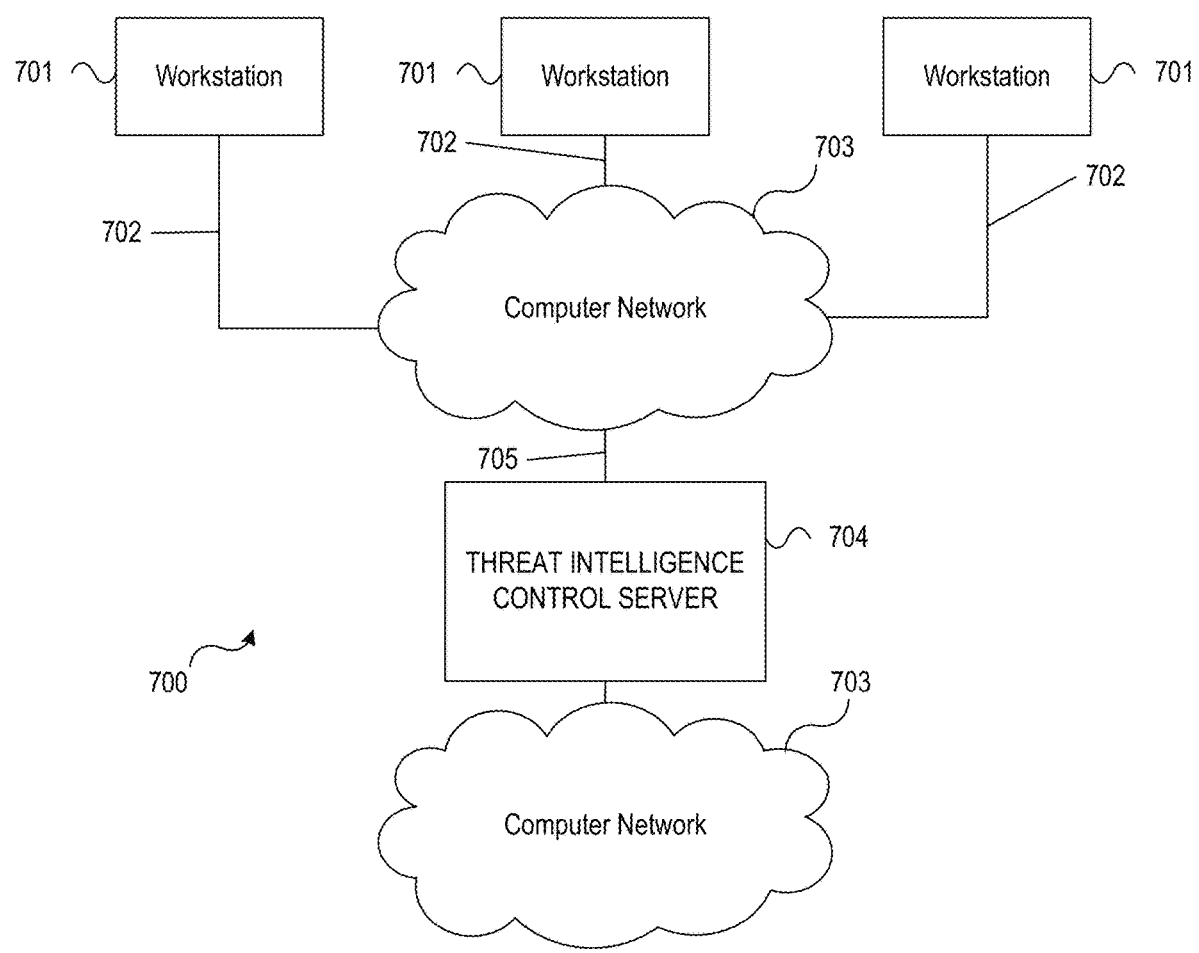
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to threat intelligence control server 704. In system 700, threat intelligence control server 704 may be a server, processor, computer, or data processing device, or combination of the same, configured to perform the functions and/or processes described herein. Server 704 may be used to receive a plurality of threat intelligence data feeds, perform one or more evaluation processes on the plurality of threat intelligence data feeds, generate one or more outputs, generate one or more overall outputs, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and threat intelligence control server 704, such as network links, dial-up links, wireless links, hardwired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive a plurality of threat intelligence data feeds from a plurality of sources, each threat intelligence data feed of the plurality of intelligence feeds including intelligence indicating a potential security compromise and each intelligence feed being received from a respective source associated with an entity;
      perform a first evaluation process on the plurality of threat intelligence data feeds, the first evaluation process including comparing first data in a first threat intelligence data feed to data in other threat intelligence data feeds to identify similarities between the first data in the first threat intelligence data feed and other data in the other threat intelligence data feeds;

based on the first evaluation process, generate a first evaluation process output, the first evaluation process output including a score for each threat intelligence data feed based on the identified similarities;

perform a second evaluation process on the plurality of threat intelligence data feeds, the second evaluation process including mapping interdependency of the first threat intelligence data feed to another threat intelligence data feed based on timeliness of data within the first threat intelligence data feed;

based on the second evaluation process, generate a second evaluation process output, the second evaluation process output including a score for each threat intelligence data feed based on the mapped interdependencies;

perform a third evaluation process on the plurality of threat intelligence data feeds, the third evaluation process including topic modeling using at least one topic modeling technique and based on one or more processing parameters identified for evaluation;

based on the third evaluation process, generate a third evaluation process output, the third evaluation process output including a score indicating a similarity between the one or more processing parameters identified for evaluation and the topic modeling; and based on the generated first evaluation process output, second evaluation output and third evaluation output, ranking the plurality of threat intelligence data feeds to identify entities providing valuable threat intelligence data.

2. The computing platform of claim 1, wherein ranking the plurality of threat intelligence data feeds includes stack ranking each threat intelligence data feed of the plurality of threat intelligence data feeds.

3. The computing platform of claim 1, further including instructions that, when executed, cause the computing platform to:

based on the generated first evaluation process output, second evaluation output and third evaluation output, identify one or more threat intelligence data feeds of the plurality of threat intelligence data feeds for removal.

4. The computing platform of claim 1, wherein the topic modeling techniques include Latent Dirichlet Allocation.

5. The computing platform of claim 1, wherein the first evaluation process further includes tokenizing and formatting each piece of data in each threat intelligence data feed.

6. The computing platform of claim 5, wherein formatting each piece of data is performed using natural language processing.

7. The computing platform of claim 6, wherein formatting each piece of data further includes removing at least one of stop words from a customizable list, punctuation, and HyperText Markup.

8. A method, comprising:

by a computing platform comprising at least one processor, memory, and a communication interface:

receiving, by the at least one processor and via the communication interface, a plurality of threat intelligence data feeds from a plurality of sources, each threat intelligence data feed of the plurality of intelligence feeds including intelligence indicating a potential security compromise and each intelligence feed being received from a respective source associated with an entity;

performing, by the at least one processor, a first evaluation process on the plurality of threat intelligence data feeds, the first evaluation process including comparing first data in a first threat intelligence data feed to data in other threat intelligence data feeds to identify similarities between the first data in the first threat intelligence data feed and other data in the other threat intelligence data feeds;

based on the first evaluation process, generating, by the at least one processor, a first evaluation process output, the first evaluation process output including a score for each threat intelligence data feed based on the identified similarities;

performing, by the at least one processor, a second evaluation process on the plurality of threat intelligence data feeds, the second evaluation process including mapping interdependency of the first threat intelligence data feed to another threat intelligence data feed based on timeliness of data within the first threat intelligence data feed;

based on the second evaluation process, generating, by the at least one processor, a second evaluation process output, the second evaluation process output including a score for each threat intelligence data feed based on the mapped interdependencies;

performing, by the at least one processor, a third evaluation process on the plurality of threat intelligence data feeds, the third evaluation process including topic modeling using at least one topic modeling technique and based on one or more processing parameters identified for evaluation;

based on the third evaluation process, generating, by the at least one processor, a third evaluation process output, the third evaluation process output including a score indicating a similarity between the one or more processing parameters identified for evaluation and the topic modeling; and based on the generated first evaluation process output, second evaluation output and third evaluation output, ranking, by the at least one processor, the plurality of threat intelligence data feeds to identify entities providing valuable threat intelligence data.

9. The method of claim 8, wherein ranking the plurality of threat intelligence data feeds includes stack ranking each threat intelligence data feed of the plurality of threat intelligence data feeds.

10. The method of claim 8, further including instructions that, when executed, cause the computing platform to:

based on the generated first evaluation process output, second evaluation output and third evaluation output, identifying, by the at least one processor, one or more threat intelligence data feeds of the plurality of threat intelligence data feeds for removal.

11. The method of claim 8, wherein the topic modeling techniques include Latent Dirichlet Allocation.

12. The method of claim 8, wherein the first evaluation process further includes tokenizing and formatting each piece of data in each threat intelligence data feed.

13. The method of claim 12, wherein formatting each piece of data is performed using natural language processing.

14. The method of claim 13, wherein formatting each piece of data further includes removing at least one of stop words from a customizable list, punctuation, and HyperText Markup.

15. One or more non-transitory computer-readable media storing instructions that, when executed by a computing platform comprising at least one processor, memory, and a communication interface, cause the computing platform to:
receive a plurality of threat intelligence data feeds from a plurality of sources, each threat intelligence data feed of the plurality of intelligence feeds including intelligence indicating a potential security compromise and each intelligence feed being received from a respective source associated with an entity;
perform a first evaluation process on the plurality of threat intelligence data feeds, the first evaluation process including comparing first data in a first threat intelligence data feed to data in other threat intelligence data feeds to identify similarities between the first data in the first threat intelligence data feed and other data in the other threat intelligence data feeds;
based on the first evaluation process, generate a first evaluation process output, the first evaluation process output including a score for each threat intelligence data feed based on the identified similarities;
perform a second evaluation process on the plurality of threat intelligence data feeds, the second evaluation process including mapping interdependency of the first threat intelligence data feed to another threat intelligence data feed based on timeliness of data within the first threat intelligence data feed;
based on the second evaluation process, generate a second evaluation process output, the second evaluation process output including a score for each threat intelligence data feed based on the mapped interdependencies;
perform a third evaluation process on the plurality of threat intelligence data feeds, the third evaluation process including topic modeling using at least one topic modeling technique and based on one or more processing parameters identified for evaluation;
based on the third evaluation process, generate a third evaluation process output, the third evaluation process output including a score indicating a similarity between the one or more processing parameters identified for evaluation and the topic modeling; and
based on the generated first evaluation process output, second evaluation output and third evaluation output, ranking the plurality of threat intelligence data feeds to identify entities providing valuable threat intelligence data.

16. The one or more non-transitory computer-readable media of claim 15, wherein ranking the plurality of threat intelligence data feeds includes stack ranking each threat intelligence data feed of the plurality of threat intelligence data feeds.

17. The one or more non-transitory computer-readable media of claim 15, further including instructions that, when executed, cause the computing platform to:
based on the generated first evaluation process output, second evaluation output and third evaluation output, identify one or more threat intelligence data feeds of the plurality of threat intelligence data feeds for removal.

18. The one or more non-transitory computer-readable media of claim 15, wherein the topic modeling techniques include Latent Dirichlet Allocation.

19. The one or more non-transitory computer-readable media of claim 15, wherein the first evaluation process further includes tokenizing and formatting each piece of data in each threat intelligence data feed.

20. The one or more non-transitory computer-readable media of claim 19, wherein formatting each piece of data is performed using natural language processing.

21. The one or more non-transitory computer-readable media of claim 20, wherein formatting each piece of data further includes removing at least one of stop words from a customizable list, punctuation, and HyperText Markup.

* * * * *